F. C. A. HERSTAD.
DEVICE FOR THE FACILITATION OF THE EXCHANGE OF BORES IN ROCK DRILLS.
APPLICATION FILED JAN. 4, 1910.
1,024,574. Patented Apr. 30, 1912.
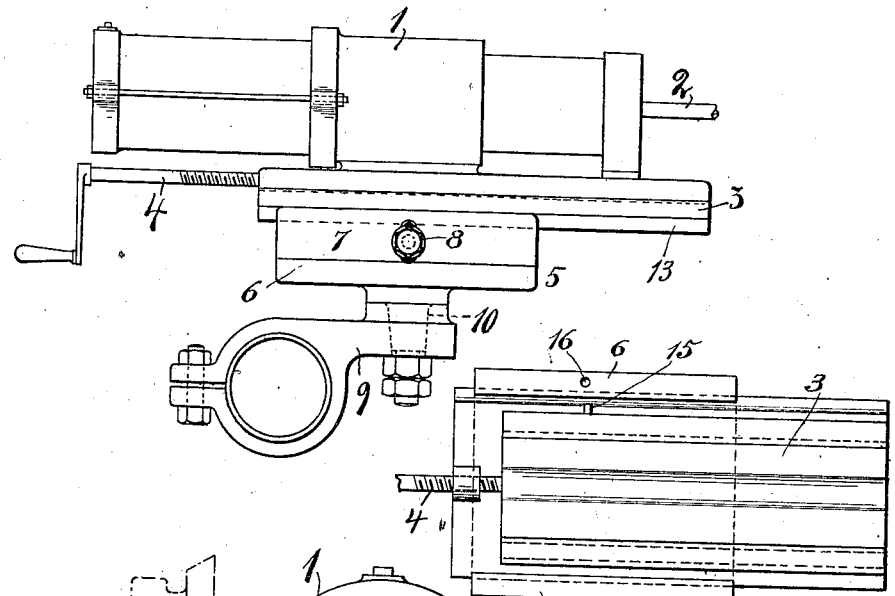
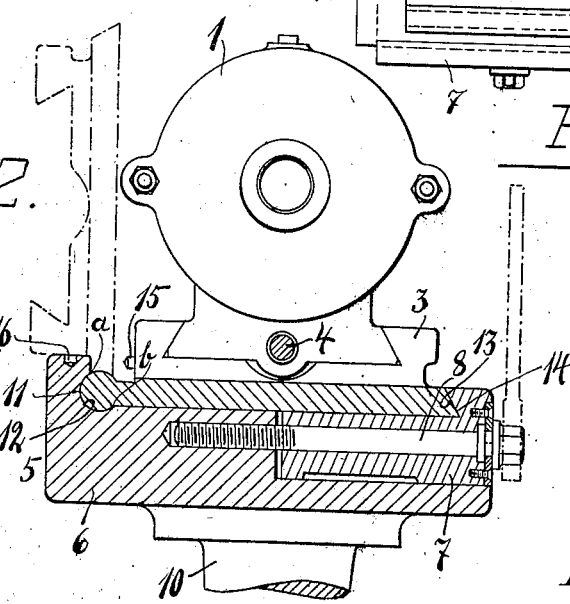
Attest:
Ewd L. Tolson
Edward N. Saxton
Inventor
Frederik C. A. Herstad,
By Wm. Wallace White
Atty.

UNITED STATES PATENT OFFICE.

FREDERIK CHRISTIAN ANDREAS HERSTAD, OF FINSPÅNG, SWEDEN.

DEVICE FOR THE FACILITATION OF THE EXCHANGE OF BORES IN ROCK-DRILLS.

1,024,574.     Specification of Letters Patent.    Patented Apr. 30, 1912.

Application filed January 4, 1910. Serial No. 536,267.

*To all whom it may concern:*

Be it known that I, FREDERIK CHRISTIAN ANDREAS HERSTAD, a subject of the King of Denmark, residing at Finspång, Sweden, have invented new and useful Improvements in Devices for the Facilitation of the Exchange of Bores in Rock-Drills, of which the following is a specification.

The invention relates to an improvement in rock drill supports for the facilitation of the exchange of drill bars.

The characteristic feature of the invention consists therein that a sufficiently large part of the drill is journaled on a bed carried by the drill support so as to be rotated or swung to the side around an axis which is parallel or nearly parallel with the longitudinal axis of the drill, in order that the drill bar shall be able, independently of its length, to be taken out of the bore-hole, and another drill bar be inserted in its place. Through the fact that the axis of rotation is placed at the side of a bed carrying the machine, this latter can be readily swung back after the exchange of drill bars into the proper working position beforehand adjusted.

The invention can be carried out in many different ways, and can be applied to many different kinds of rock-drills, as, for instance, hammer drills.

In the accompanying drawing there is shown a form of construction of the invention applied to a pneumatic rock drill with screw feed.

Figure 1 shows the machine in side elevation, and Fig. 2 the same on a larger scale seen partly from behind in vertical transverse section. Fig. 3 is a plan view, the cylinder being removed for the sake of clearness.

1 is the pneumatic drill-cylinder and 2 the drill bar. The cylinder 1 with the drill bar 2 is arranged with sliding movement in the guide of the piece 3, and, during the drilling, can be fed forward along said piece 3 by means of the screw 4. The piece 3 rests in a guide on the bed 5, which is divided into two longitudinal parts 6, 7, which are held together by means of the screw 8. The bed, 5, rests, as usual, on the frame-part 9, by means of the cone 10, or some similar device. The piece 3 is provided at one side with a cylinder-shaped rounding-off 11 which fits into a corresponding groove 12 on the part 6. The rounding-off 11 is embraced by the groove 12 in such a way that the former cannot be drawn out to the side out of the latter, but is displaceable in the longitudinal direction of the same, *i. e.*, the distance between the points *a* and *b* is less than the diameter of the cylindrical rounding-off 11. The part 7 is provided with a beveling, 13, which embraces a beveling, 14, on the part 3. When the screw 8 is turned, the beveling 13 and the cylindrical groove 12 form a guide for the piece 3, in which guide the latter can be displaceably moved. When the drill bar is to be exchanged, the cylinder 1 is screwed back so far that the drill bar can be released from the same. The part 7 is moved to the side from the parts 6 by rotating the screw 8, so that the beveling 13 releases the beveling 14. Thereafter, the piece 3 is swung with the cylinder 1 upward as is marked in Fig. 2 by means of dotted lines, in doing which the rounding-off 11 rotates in the groove 12, which latter forms a journal for the former. The drill bar can now be drawn out of the bore-hole and another drill-bar can be inserted in the said hole instead. The piece 3 with the cylinder 1 is thereafter lowered and the screw 8 is turned, so that the parts once more take up the position given with full lines. In order in the sloping position of the piece 3 to prevent the drill-parts 1, 3 from gliding in a longitudinal direction out of the guides 12, 13, there is arranged at the side of the piece 3 a projection 15, which, in the upturned position engages in a corresponding recess 16 in the bed 5.

As is seen by Fig. 2, the parts 1, 3, when in an upturned position, leave sufficient room for the extraction of the drill-bar. When the same parts are again lowered onto the bed 5, which, during the exchange, did not need to be moved, these parts again reoccupy exactly their original positions, without there being any necessity for wasting time with adjusting the same. This form of construction can be altered in many ways.

I claim—

1. In a device of the class described, in combination, a drill and a bed upon which said drill is mounted, said bed being provided with a rounded groove and said drill being provided with a rounded portion engaging said groove, whereby said drill may be rotated with respect to said bed, said groove and said rounded portion extending parallel to the axis of the drill bar, said groove and said rounded portion lying to one side of a vertical plane passing through the longitudinal axis of the drill bar.

2. In a device of the class described, in combination, a drill and a bed upon which said drill is mounted, said bed being provided with an arc-shaped groove and said drill being provided with an arc-shaped portion engaging said groove, whereby said drill may be rotated with respect to said bed, said groove and said portion extending parallel to the axis of the drill and said groove comprising an arc greater than a semi-circumference whereby lateral movement of the drill with respect to the bed is prevented.

3. In a device of the class described, in combination, a drill and a bed upon which said drill is mounted, said bed being provided with a rounded groove and said drill being provided with a rounded portion engaging said groove, whereby said drill may be rotated with respect to said bed, said groove and said rounded portion extending parallel to the axis of the drill, said rounded portion being longitudinally slidable with respect to said groove.

In testimony whereof I have signed my name to this specification in the presence of two subscribing witnesses.

FREDERIK CHRISTIAN ANDREAS HERSTAD.

Witnesses:
J. F. A. RUTBACK,
FRIDOLF BLOMQUIST.